United States Patent [19]

Cummings et al.

[11] Patent Number: 5,214,244
[45] Date of Patent: May 25, 1993

[54] STRUMMING RESISTANT CABLE

[75] Inventors: Thomas R. Cummings; Douglas E. Brown, both of East Lyme, Conn.

[73] Assignee: Science Applications International Corporation, San Diego, Calif.

[21] Appl. No.: 806,811

[22] Filed: Dec. 6, 1991

Related U.S. Application Data

[63] Continuation of Ser. No. 597,105, Oct. 12, 1990, abandoned, which is a continuation of Ser. No. 264,093, Oct. 28, 1988, abandoned.

[51] Int. Cl.$^5$ .................... H02G 7/14; H01B 7/00; F15D 1/10
[52] U.S. Cl. ................. 174/42; 174/119 R; 174/117 R; 57/204; 57/207; 114/243
[58] Field of Search .............. 174/42, 101.5, 117 R, 174/119 R; 114/243; 52/84; 57/204, 206, 207; 428/397, 399; 367/130, 901

[56] References Cited

U.S. PATENT DOCUMENTS

| | | | |
|---|---|---|---|
| 3,023,483 | 3/1962 | Steiner | 57/206 X |
| 3,076,533 | 2/1963 | Scruton et al. | 52/173 R |
| 3,296,357 | 1/1967 | Greber | 174/42 |
| 3,884,173 | 5/1975 | Fabula | 114/243 |
| 3,991,550 | 11/1976 | Cohen | 174/42 X |

FOREIGN PATENT DOCUMENTS

| | | | |
|---|---|---|---|
| 1124245 | 6/1956 | France | 174/117 R |
| 470881 | 4/1952 | Italy | 174/117 R |
| 159233 | 3/1921 | United Kingdom | 174/117 R |

OTHER PUBLICATIONS

Two-page advertising brochure bearing the trademark STARSTRAKE.
Four-page advertising brochure bearing the trademarks FLEXNOSE and RIGSTREAM.
The 1988 General Oceanics Catalog, p. 5 and title page.
Bulletin ZT-404-1279-2M from the Zipper Tubing Company.
Bulletin No. 627-1081 from the Zipper Tubing Company.
Bulletin No. 305-282 from the Zipper Tubing Company.
Bulletin No. 217-881 from the Zipper Tubing Company.
Bulletin No. 623-281 from the Zipper Tubing Company.
Endeco, Inc., Data Sheet No. 126 discloses a Type 1158 Clip-On Fairing comprised of polyvinyl chloride, Jun. 1987.
Endeco, Inc., Data Sheet No. 23 discloses a haired fairing which reduces cable drag, acoustic noise, cable vibration and fatigue, May 27, 1975.
Report No. 1191, "On The Development Of Turbulent Wakes From Vortex Streets," A. Roshko, National Advisory Committee for Aeronautics, 1954.
M. S. Bloor, "The Transition to Turbulence In the Wake Of A Circular Cylinder," General Fluid Mechanics, vol. 19, Part 2, 1964, pp. 290-304.
J. H. Lienhard, "Synopsis of Lift, Drag, and Vortex Frequency Data For Rigid Circular Cylinders," Washington State University, Bulletin No. 300 (1966).

Primary Examiner—Leo P. Picard
Assistant Examiner—B. Lee Ledynh
Attorney, Agent, or Firm—Fitch, Even, Tabin & Flannery

[57] ABSTRACT

An underwater cable has a flexible, elongated core surrounded by a flexible, elongated jacket. A distributed jacket includes a helically displaced phase shifter to decouple the cable from strumming produced by shedding of von Karman vortex streets from the cable.

3 Claims, 2 Drawing Sheets

STRUMMING RESISTANT CABLE

This is a continuation of application Ser. No. 597,105, filed Oct. 12, 1990, now abandoned, which is a continuation of application Ser. No. 264,093, filed Oct. 28, 1988, now abandoned.

BACKGROUND OF THE INVENTION

The invention relates to cables subject to fluid flow. In particular, the invention relates to a cable subject to fluid flow having a polygonal cross section and a helical outer surface for reduction of strumming or transverse vibration caused by fluid flowing past the cable.

It has been well known for some time that fluids such as air or water flowing in a transverse direction past a stretched body, for instance a cable or a wire having a circular transverse cross section, generate lift and drag forces, as well as vortices in the fluid adjacent to and downstream from the cable. In some instances, the vortices may be simultaneously generated and shed at portions of the cable displaced 90° from the direction of fluid flow, thereby leaving the lift forces on the cable in balance transverse to the direction of fluid flow. It has also been found, however, that vortices may be formed and shed alternatively on opposite sides of the cable. The vortices are aligned parallel to the cable in columns known as von Karman vortex streets. When the vortex streets are formed and shed alternately on respective sides of the cable, the lift forces are unbalanced, and a resulting periodic transverse alternating force is applied to the cable. If the shedding frequency of the alternating vortices approaches or is equal to a natural frequency of the cable, the cable will be driven resonantly into large transverse vibrations. The resonant vibrations, known as strumming, drastically accelerate deterioration of the cable due to structural fatigue. For instance, a typical cable may have a life of one million to ten million flexures. Such a cable may be driven transversely at frequencies as high as 100 Hertz by fluid flowing past it. Since the resonant vibration leads to high stress concentrations at the nodal points on the cable, a cable resonating at 100 Hertz could well break within the space of a few days.

In order to lengthen cable life by reducing cable failure due to resonant vibration or strumming, a number of solutions have been attempted which affect the formation of the von Karman vortex streets. One solution teaches modifying a normally smooth circularly cylindrical surface of the cable by roughening the surface. Typically, splitter plates extend outwardly from the cable at random points in an attempt to alter the separation positions of the vortices from the outer wall of the cable and reduce the resonance effects along the length of the cable. Splitter plates, however, are relatively expensive and not very effective.

A number of fairings have also been used in association with the cables. One such fairing, referred to as a haired fairing, employs heavy monofilament urethane strands having a length approximately three to four times the diameter of the cable and extending outwardly therefrom. Again, it is relatively expensive to form the strands on the cable jacket. Although the strands may displace the vortex streets downstream from the cable along the flow path of the current, they do not eliminate the production of the oscillatory force which resonantly drives the cable.

A still further solution which has been attempted by those skilled in the art is the use of a NACA (National Advisory Committee on Aeronautics) fairing of the type similar to an airfoil but having symmetrical surfaces. NACA fairings, however, must be free to pivot about the cable as the direction of the current or fluid flow changes. As a result, the fairings are very expensive, although they do suppress the production of vortices and concomitant strumming.

Workers in the art have also employed helically wound strakes to reduce vibration and strumming in circular cylindrical structural members such as ocean structures, drill pipes and riser casings. Each of the strakes consists of a strain cable having a semi-rigid, polyvinyl chloride jacket with a three pointed star cross-section surrounding it. The strakes are spaced 120° apart on the structural member to be protected and are wrapped around it in a triple helix. They may be purchased from Fathom Oceanology Ltd., Mississauga, Ontario, Canada, which identifies them with the trademark Starstrake. The Starstrake system suffers from the disadvantage that it requires a rigid column as a central structure. The column is placed in compression by the strakes. Clearly, the strakes could not be employed with a central member which could not withstand a compressional load, such as a cable.

What is needed is a new cable form which reduces or eliminates the production of resonant transverse forces on the cable.

SUMMARY OF THE INVENTION

A cable having a flexible, elongated core has a flexible, elongated jacket surrounding it and in contact with it. A phase shifter preferably of triangular cross section, is formed integrally with the flexible elongated jacket to comprise a twisted unitary structure and presents a continually changing profile to a fluid flow field. More specifically, the cross section of the cable is preferably an equilateral triangle. The equilateral triangle cross section is rotationally displaced along the cable to define a or helically wound single pitch direction outer surface on the cable. Specifically, the helix or turn rate of the equilateral triangle cross section is such that several complete rotations of the equilateral triangle occur within a single coherence length of a vortex street. A vortex street coherence length is the distance, measured along the cable, in which a coherent energy field is created by the fluid flow past the outer surface of the cable. The coherence length for a cylindrical cable is typically sixty times the effective diameter of the cable. The effective diameter of a cable includes the outer diameter of the cable and a layer of fluid which clings to the outer surface of the cable.

It is a principal aspect of the present invention to provide a strumming resistant cable having a distributed transverse force phase shifter.

It is another aspect of the present invention to provide a strumming resistant cable having a jacket thereof including a helical phase shifter.

It is a still further aspect of the instant invention to provide a strumming resistant cable having a helix pitch large enough to provide at least several 360° rotations of the helix in a single coherence length of a vortex street.

Other aspects of the instant invention will become obvious to one skilled in the art upon a perusal of the specification and claims in light of the accompanying drawings.

DESCRIPTION OF THE PREFERRED EMBODIMENTS

Figure 1:
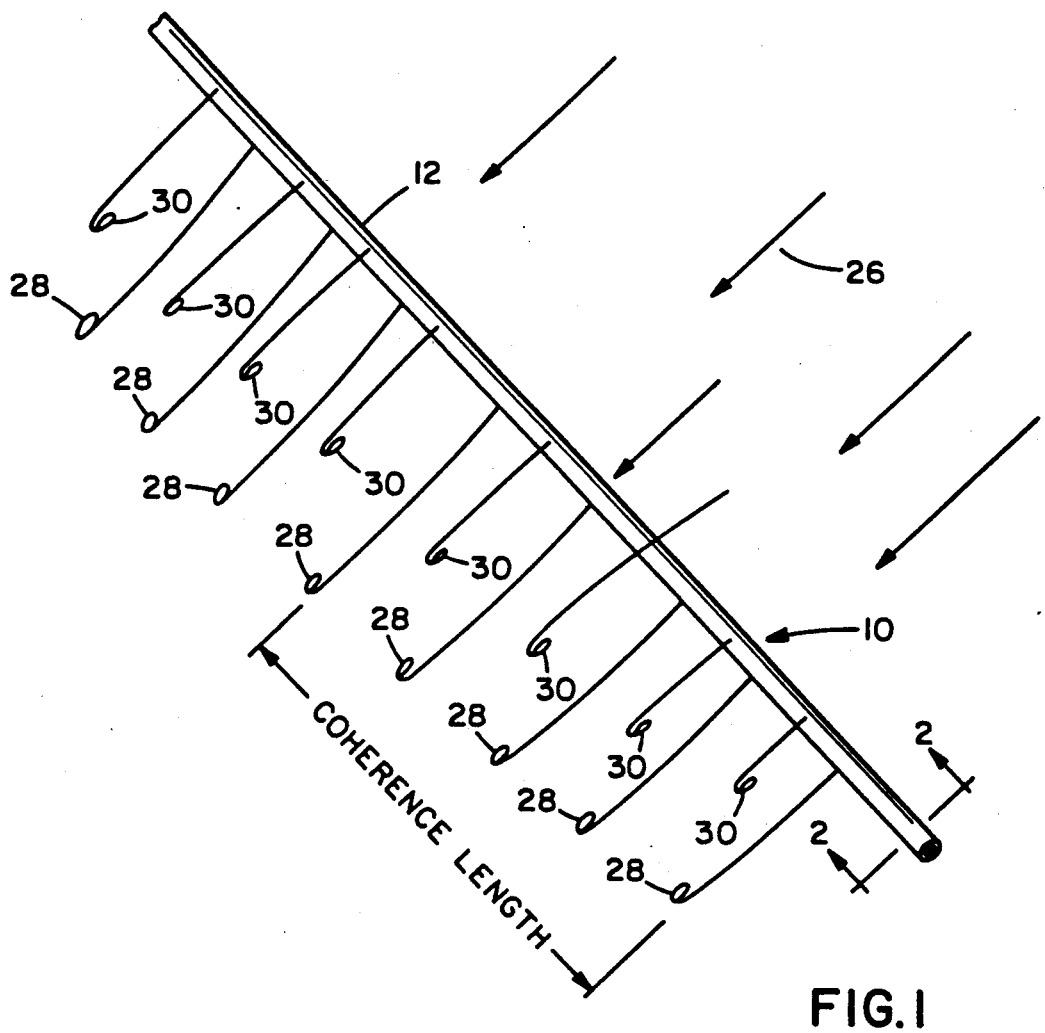
FIG. 1 is an isometric view of a prior art marine cable having a circularly cylindrical geometry and showing details of the fluid flow and vortex formation with respect to the cable.
Figure 2:
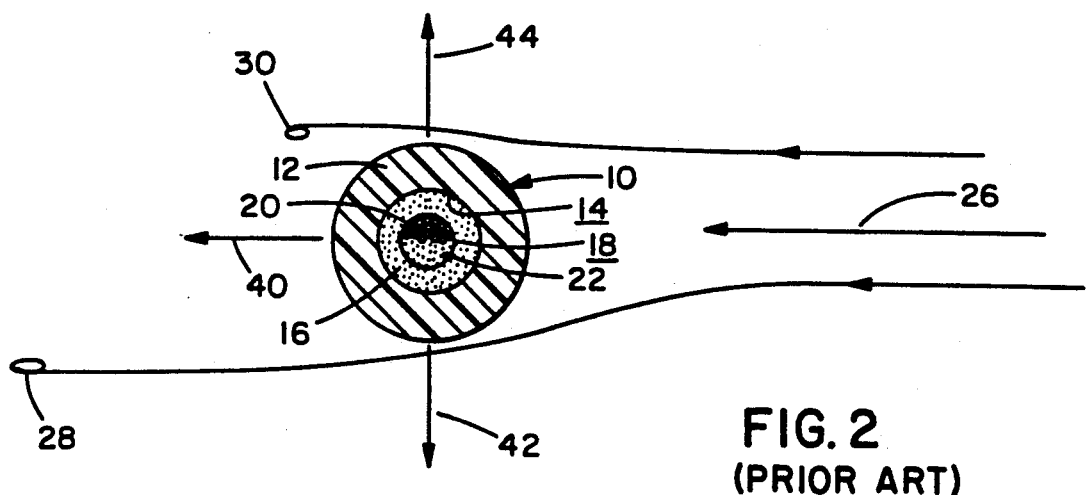
FIG. 2 is a transaxial sectional view of the cable of FIG. 1 taken substantially along line 2—2 of FIG. 1 and showing the direction of fluid flow past the cable and the direction in which the cable is displaced by the periodic driving forces applied to the cable by respective alternating vortices.

Referring now to the drawings and especially to FIGS. 1 and 2, a prior art cable, generally referred to by numeral 10, is shown therein. The prior art cable 10 has a substantially circular cross section as may best be seen in FIG. 2. The cable 10 is comprised of a polyethylene jacket 12 having a core 14 positioned therein. The core 14 includes a strength member 16, which comprises a plurality of very fine aromatic polyamide fibers aligned substantially axially. A signal carrying section 18 is positioned within the fibers 16 and typically consists of a plurality of copper wires 20 and/or a plurality of optical fibers 22.

Referring back to FIG. 1, it may be seen that the cable 10 is shown immersed in water and exposed to a fluid flow field 26. As the fluid passes transversely of the cable 10, the cable 10 sheds vortices. A first plurality of vortices defines a vortex street 28, a second plurality of vortices defines a vortex street 30. The distance taken parallel to the cable in which a coherent fluid energy field is created by the flow of water past the cable 10 is known as the coherence length of the von Karman vortex street.

As may best be seen in FIG. 2, the cable 10 is subjected to a drag force, as indicated by a vector 40, caused by the flow field 26. Alternate lifting forces are applied to the cable 10 as well, as shown by a downward vector 42 and an upward vector 44, occasioned by fluid flow over the curved surface. It may be appreciated that the distance between the vortex street 28 and the vortex street 30 has not been shown to scale in FIG. 2 in order to disclose details of the cable 10. A typical distance between vortex streets for a right circular cylindrical cable is approximately sixty times the diameter of the cable jacket 12.

When the fluid flow is low enough that vortices are not formed by the fluid flow field 26, the lift forces 42 and 44 on the cable 10 are balanced and the cable 10 is not displaced in the direction of either of the two lift forces 42 or 44. For purposes of definition herein, the directions of the lift forces 42 and 44 will be referred to as transverse with respect to the flow field 26. The drag force 40, of course, is present on the cable 10 at wherever it is exposed to the flow field.

As the velocity of the fluid flow field 26 increases, the vortex streets 28 and 30 tend to be formed adjacent to the cable 10 at different times causing the lift force pair 42 and 44 to be unbalanced and oscillating. The cable 10 is driven into resonant transverse oscillation when the rate at which the vortex streets 28 and 30 are shed approaches the natural frequency of the cable 10.

Figure 3:
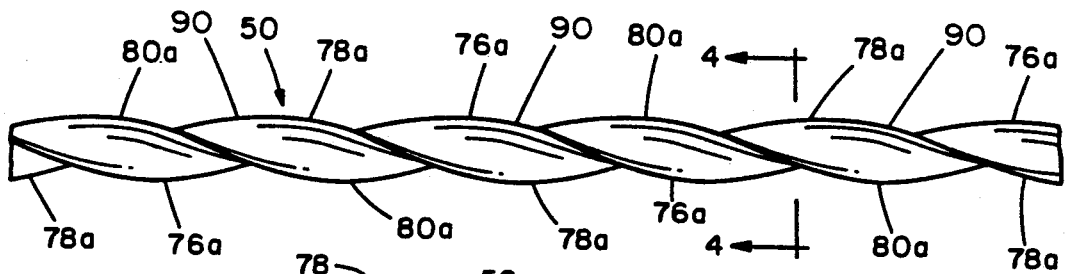
FIG. 3 is an elevational view of a cable embodying the present invention showing details of the relative displacement of the vortices and vortex streets from the cable body.
Figure 4:
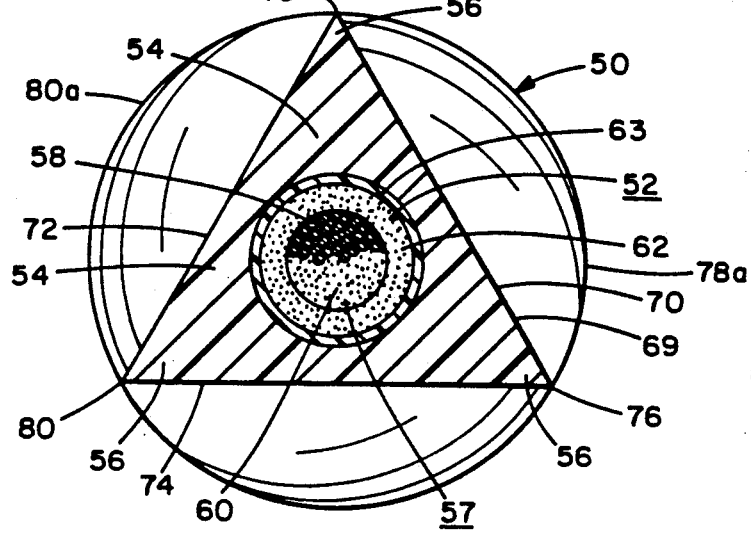
FIG. 4 is a sectional view taken substantially along line 4—4 of FIG. 3 showing internal details of the cable of FIG. 3.

FIGS. 3 and 4 show a cable 50 embodying the present invention. Although the cable 50 as described herein is intended for an underwater environment, it may also be used in other fluid environments, for instance in air, where strumming suppression is important. The cable 50 has a flexible, elongated core 52 which is surrounded by a flexible, elongated polyethylene jacket 54. A phase shifter 56 is formed integrally with the flexible, elongated jacket 54. The flexible elongated jacket 54 and the phase shifter 56 comprise a twisted unitary structure.

The core 52 has a signal carrying means 57 composed of a plurality of copper conductors 58 adapted to carry electrical signals and a plurality of single-mode optical fibers 60 adjacent and parallel to the copper conductors 58. The core 52 also includes a strength member 62 comprising a plurality of aromatic polyamide fibers aligned parallel to the copper conductors 58 and the single-mode optical fibers 60. In alternative embodiments of the cable 50, which would not be used for carrying signals, the signal carrying means 57 would be omitted from the core 52. The core 52 would be filled completely with the strength member 62.

In the process of assembly of the cable 50, a polyester fiber braided jacket 63 having a thickness of about 3 mils surrounds the polyamide fibers to maintain them in alignment with the copper conductors 58 and the single-mode optical fibers 60 while the jacket 54 is being extruded therefor. The polyester fibers of the braided jacket 63 are derived from polyethylene terephthalate. In an alternative embodiment, a one mil thick nylon strip having a width approximately three times the diameter of the strength member 62 may be wound helically around the polyamide fibers.

The jacket 54, as stated above, is preferably composed of polyethylene. In alternative embodiments the jacket 54 may be composed of polypropylene when it is desired to make a buoyant cable. The jacket 54 may be composed of a urethane compound when it is desirable to expose the cable 50 to low temperatures and it is necessary that the cable 50 remain flexible.

As may be seen in FIG. 4, the cross section of the cable 50, and in particular the jacket 54 and the integral phase shifter 56, is that of an equilateral triangle 69 having a first side 70, a second side 72, and a third side 74. The side 70 and the side 74 define an apex 76. The side 70 and the side 72 define an apex 78, and the side 72 and the side 74 define an apex 80. The equilateral triangle 69 is rotationally displaced at a constant rate with a single pitch direction as the cable body 50 is traversed longitudinally. Thus, the apex 78 defines an edge 78a, the apex 76 defines an edge 76a and the apex 80 defines an edge 80a. In the preferred embodiment the equilateral triangle is rotated 360° for each 8 inches of cable that is longitudinally traversed. The helical form defined on the outside of the cable shifts the phase of the vortex streets continuously as the equilateral triangle 69 is rotatably displaced along the cable 50. More particularly, for each 120° of rotation of the equilateral triangle 69, a phase shift through an entire coherence length of the vortices occurs. Because the cable 50 has a diameter of approximately one quarter inch, and because, as previously mentioned, the coherence length for a circularly cylindrical cable is typically sixty times the effective diameter of the cable, the coherence length for the vortex streets for a comparable circular cross section cable would be about 15 inches. The helix rate for this preferred embodiment is 360° for each eight inches of longitudinal displacement along the cable 50. Thus, the instant cable 50 has a plurality of phase shifting sections 90 distributed along its outer surface which effectively decouple the resonant wavelength of the vortex streets from the natural frequency of the cable 50 by presenting a continually changing profile to the fluid flow field. Thus, each of the phase shifting sections 90 has a length less than one quarter the coherence length of the vortex streets. In addition, because the jacket 54 and the phase shifter 56 cross section is triangular, the moment of inertia of the cable 50 in response to a particular bending moment changes as the cable 50 is traversed longitudinally, further causing the cable 50 to depart from the resonant behavior exhibited by the uniform cross section circular cables of the prior art.

One of the particular advantages of the phase shifter 56 is that it may be quickly and easily molded integrally with the jacket 54. The helical phase shifting sections 90 decouple the cable 50 from the strumming modes which the cable 50 would normally experience in a fluid flow field; however, unlike the prior art systems which employ fairings which are relatively expensive, the cable 50 embodying the instant invention is inexpensive to manufacture.

Furthermore, the cable 50 has advantages over the prior art helical strake system in that the addition of such strakes to the outside of a cable jacket would be expensive and considerably increase the drag force which the cable would experience. Furthermore, because the cable core and jacket are flexible, the separate strakes could not be maintained under tension by the cable 50.

Figure 5:
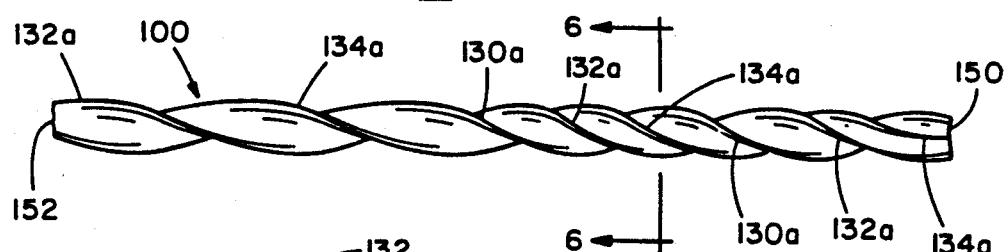
FIG. 5 is an elevational view of a cable embodying an alternative form of the present invention.
Figure 6:
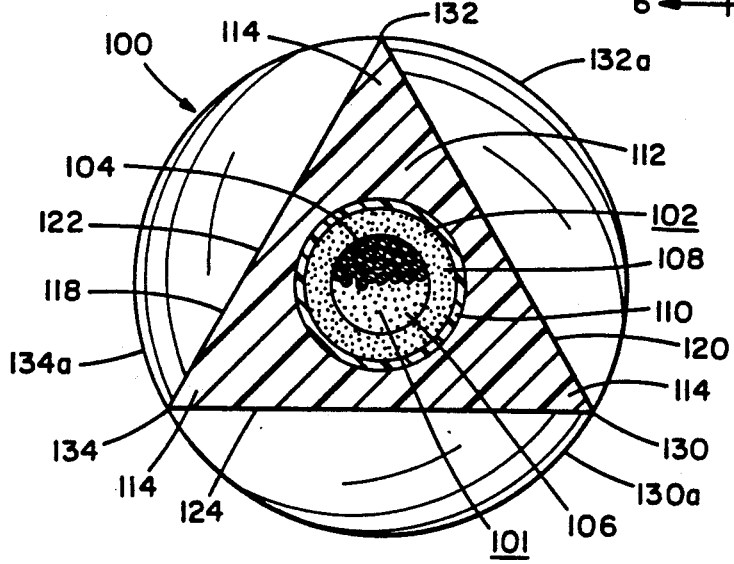
FIG. 6 is a sectional view taken substantially along line 6—6 of FIG. 5 showing internal details of the cable of FIG. 5.

Referring now to FIGS. 5 and 6, an alternative embodiment of the invention is disclosed in the form of a cable 100. The cable 100 differs from the cable 50 primarily in that its helix or turn rate varies as the longitudinal dimension of the cable is traversed, although the phase shifter has a single pitch direction. The cable 100 has a core 102 comprised of a signal carrying means 101 having a plurality of copper conductors 104 and a plurality of single-mode optical fibers 106. A plurality of aromatic polyamide fibers comprising a strength member 108 surrounds the copper conductors 104 and the single-mode optical fibers 106 and is aligned parallel thereto. A polyester fiber braided jacket 110 having a thickness of about 3 mils surrounds the polyamide fibers 108 to hold them in place prior to extrusion of a polyethylene jacket 112 over the core 102. The polyester fibers of the braided jacket 110 are derived from polyethylene terephthalate. Alternatively, a one mil thick nylon strip is helically wound around the polyamide fibers 108 to hold them in place prior to extrusion of the polyethylene jacket 112 over the core 102. The polyethylene jacket 112 has formed integrally therewith a phase shifter 114, which comprises a unitary twisted structure. It may be appreciated from an examination of FIG. 6 that the cable 100 has an equilateral triangular cross section wherein an equilateral triangle 118 has a first side 120, a second side 122, and a third side 124. The sides 120 and 124 define an apex 130. The sides 120 and 122 define an apex 132. The sides 122 and 124 define an apex 134. The equilateral triangle is rotationally displaced as the cable 100 is longitudinally traversed. The apex 132 thus defines an edge 132a. The apex 130 defines an edge 130a, and the apex 134 defines an edge 134a.

In the cable section 100 shown in FIG. 5, the cable has a first end 150 and a second end 152. It may be appreciated that the helix rate or turn rate of the equilateral triangle 118 is much larger at the second end 152 than at the first end 150. Nevertheless, the alternative embodiment of the cable 100 is anti-resonant to strumming which would normally be generated by fluid flow over a comparable circular cable. The cable 100 is particularly useful in environments in which the cable 100 would be exposed to more than one fluid flow field. For instance, helicopter towed underwater equipment might be connected to a helicopter by the cable 100. The variable helix rate would allow the cable to remain anti-resonant both above the water and below.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A cable, comprising:
   a single central flexible elongated core having an electromagnetic signal carrier positioned therein for carrying electromagnetic signals; and
   a flexible elongated regular polygonal cross-section jacket having a plurality of vertices and surrounding the single central flexible elongated core, said jacket being comprised of a material which is impermeable to $H_2O$, the vertices comprising a helically wound phase shifter having a single-pitch direction extending longitudinally along substantially the entire length of said flexible elongated jacket for shifting a phase of an alternating force produced by a flow of fluid past the flexible elongated jacket, and having a plurality of phase shifting sections longitudinally distributed along the flexible elongated jacket, each of the phase shifting sections having a length less than one quarter the coherence length of the flexible jacket and shifting the period of the alternating force from zero to a period.

2. A cable as defined in claim 1, wherein the helically wound phase shifter has a triangular cross section.

3. A cable as defined in claim 2, wherein the triangular cross section is an equilateral triangular cross section.

* * * * *

UNITED STATES PATENT AND TRADEMARK OFFICE
CERTIFICATE OF CORRECTION

PATENT NO. : 5,214,244
DATED : May 25, 1993
INVENTOR(S) : Cummings et al.

It is certified that error appears in the above-identified patent and that said Letters Patent is hereby corrected as shown below:

Column 2, line 42, after "a" insert --helical--.

Column 2, line 50, after "a" insert --circularly--.

Column 5, line 9, delete ",".

Signed and Sealed this

Fifteenth Day of March, 1994

Attest:

BRUCE LEHMAN

Attesting Officer     Commissioner of Patents and Trademarks